United States Patent [19]

Wibecan

[11] Patent Number: 5,537,541
[45] Date of Patent: Jul. 16, 1996

[54] SYSTEM INDEPENDENT INTERFACE FOR PERFORMANCE COUNTERS

[75] Inventor: Brian F. Wibecan, Acton, Mass.

[73] Assignee: Digital Equipment Corporation, Maynard, Mass.

[21] Appl. No.: 291,240

[22] Filed: Aug. 16, 1994

[51] Int. Cl.$^6$ ................................ G01R 31/28
[52] U.S. Cl. .................. 395/183.21; 395/184.01; 395/183.13
[58] Field of Search ............... 395/180, 183.14, 395/183.15, 183.21, 183.22, 184.01

[56] References Cited

U.S. PATENT DOCUMENTS

| | | | |
|---|---|---|---|
| 4,435,759 | 3/1984 | Baum et al. | 364/200 |
| 4,488,227 | 12/1984 | Miu et al. | 364/200 |
| 5,375,199 | 12/1994 | Harrow et al. | 395/159 |
| 5,426,741 | 6/1995 | Butts, Jr. et al. | 395/325 |
| 5,450,349 | 9/1995 | Brown, III et al. | 395/183.03 |

OTHER PUBLICATIONS

Dongarra, J. et al., Scientific benchmark characterizations, 1993, Computer Benchmarks, Elsevier Science Pub., pp. 127–140.
Smith, J., Characterizing Computer Performance w/a single number, ACM, 1988, pp. 1203–1206.
McDowell, C., Debugging Concurrent Programs, 1989, IEEE pp. 25–34.
Snodgrass, R., Monitoring in a software development environment, 1984 ACM SIGSOFT, pp. 124–129.
J. Dongarra & J. Martin, Computer benchmarking: paths and pitfalls, IEEE pp. 38–43, Jul. 1987.
R. Weicker, An overview of Common Benchmarks, Dec. 1990, IEEE pp. 65–75.
LeDoux, C., Saving Traces for ADA Debugging, ADA in use proceedings of ADA International Conference, 1985.
"Performance Monitoring", Chapter 66, Microsoft Win32 Programmer's Reference, vol. 2, pp. 459–487.

Primary Examiner—Robert W. Beausoliel, Jr.
Assistant Examiner—Norman M. Wright
Attorney, Agent, or Firm—Dirk Brinkman; Ronald C. Hudgens; Arthur Fisher

[57] ABSTRACT

In a computer system, events indicative of the performance of the system are generated by system hardware and software. A user requests control of counters of different designs for counting the events. If the request for control of the counters is granted, a set of events is selected for monitoring according to predetermined attributes which characterize the events. A determination is made if the events of the set are valid, and they are determined to be valid, each event of the set are coupled to a corresponding one of the counters. The counters are then enabled to count the events of the set.

9 Claims, 8 Drawing Sheets

PRIOR ART

| | |
|---|---|
| PfmAllocate | — 511 |
| PfmDeallocate | — 512 |
| PfmSetPMEBit | — 513 |
| PfmClearPMEBit | — 514 |
| PfmCreateSampleBuffer | — 521 |
| PfmSetSampleSkip | — 522 |
| PfmSetValidCounters | — 523 |
| PfmCreateHistogramBuffers | — 524 |
| PfmAddAddressHistogramBuffer | — 525 |
| PfmDeleteBuffers | — 526 |
| PfmReadHistograms | — 527 |
| PfmClearHistograms | — 528 |
| PfmWriteBuffer | — 529 |
| PfmSelectEvents | — 531 |
| PfmSetModes | — 532 |
| PfmSetEvents | — 533 |
| PfmEventCounterMap | — 534 |
| PfmStart | — 535 |
| PfmStop | — 536 |
| PfmPause | — 537 |
| PfmResume | — 538 |
| PfmRead | — 539 |
| PfmReadAll | — 540 |
| PfmWrite | — 541 |
| PfmClear | — 542 |
| PfmCounterNumber | — 543 |
| PfmEventSetSize | — 551 |
| PfmClearEventSet | — 552 |
| PfmInsertEvent | — 553 |
| PfmDeleteEvent | — 554 |
| PfmMaskEventSet | — 555 |
| PfmRemoveEventSet | — 556 |
| PfmVerifyEventInSet | — 557 |
| PfmEventToNumber | — 558 |
| PfmNumberEventsInSet | — 559 |
| PfmExpandEventSet | — 560 |
| PfmMergeEventSet | — 561 |

| | |
|---|---|
| CtrAvailableEvents | 611 |
| CtrAvailable Freqs. | 612 |
| CtrAvailableModes | 613 |
| CtrAvailable Funcs. | 614 |
| CtrNumCounters | 615 |
| CtrCurrentEvents | 621 |
| CtrCurrent Freqs. | 622 |
| CtrCurrentModes | 623 |
| CtrCurrentState | 624 |
| CtrCounterNumber | 625 |
| CtrClearContext | 631 |
| CtrSelectEvents | 632 |
| CtrSetEvents | 633 |
| CtrSetModes | 634 |
| CtrEnable | 635 |
| CtrDisable | 636 |
| CtrPause | 637 |
| CtrResume | 638 |
| CtrClear | 639 |
| CtrWrite | 640 |
| CtrRead | 641 |
| CtrReadAll | 642 |
| CtrEventSetSize | 650 |
| CtrClearEventSet | 651 |
| CtrInsertEvent | 652 |
| CtrDeleteEvent | 653 |
| CtrMaskEventSet | 654 |
| CtrRemoveEventSet | 655 |
| CtrVerifyEventInSet | 656 |
| CtrEventToNumber | 657 |
| CtrNumberEventsInSet | 658 |
| CtrExpandEventSet | 659 |
| CtrMergeEventSet | 660 |

SYSTEM INDEPENDENT INTERFACE FOR PERFORMANCE COUNTERS

FIELD OF THE INVENTION

The present invention relates generally to computer systems, and more particularly to monitoring a performance of computer systems.

BACKGROUND OF THE INVENTION

Monitoring the performance of operating computer systems is a frequent and extremely important task performed by hardware and software engineers. Hardware engineers need performance data to determine how new computer hardware operates with existing operating systems and application programs. Specific designs of hardware structures, such as processor, memory and cache, can have drastically different, and sometimes unpredictable utilizations for the same set of programs. It is important that any flaws in the hardware be identified before the design is finalized. Performance data can identify how efficiently software uses hardware, and can be helpful in identifying potential hardware problems.

Software engineers need to identify critical portions of programs. For example, compiler writers would like to find out how the compiler schedules instructions for execution, or how well execution of conditional branches are predicted to provide input for software optimization.

It is a problem to accurately monitor the performance of hardware and software systems without disturbing the operating environment of the computer system. Known systems are typically hand crafted. Costly hardware and software modifications may need to be implemented to ensure that operations of the system are not affected by the monitoring systems.

Figure 1:
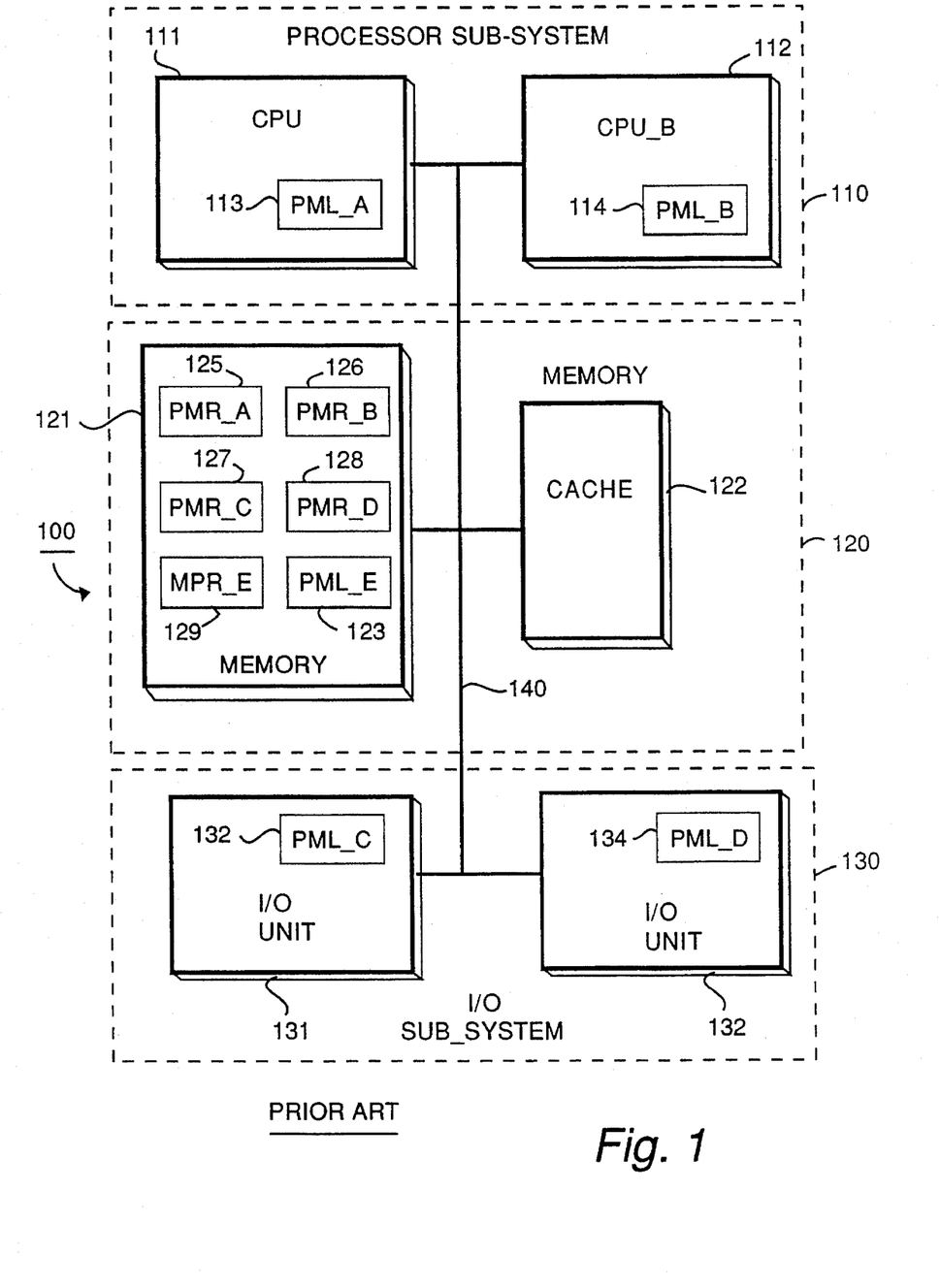
FIG. 1 is a block diagram of a computer system including prior art performance monitoring systems.

There are a number of problems with traditional performance monitoring systems. Generally, the known systems are designed for specific hardware and software architectures. FIG. 1 shows a possible prior art arrangement of a computer system 100 to be monitored for performance. The system 100 includes a processor sub-system 110, a memory sub-system 120, and an input/output (I/O) sub-system 130 connected to each other by a communications bus 140. The processor sub-system 110 can include one or more central processing units (CPUs) 111–112. The CPUs can be of different designs, each executing instructions substantially in parallel. The memory sub-system 120 can include a main memory 121 and one or more caches 122 to accelerate data access. The I/O sub-system 130 can include I/O units 131–132 for supplying and persistently storing data.

In order to monitor system performance, the CPUs 111–112 include on-board performance monitoring logic PML-A 113 and PML-B 114. The I/O units 131–132 include performance monitoring logic PML-C 133 and PML-D 134. In addition, operating system software stored in the main memory 121 can include software maintained performance monitoring logic PML-E 123. In general, each of the performance monitoring logic 113–114, 133–134, and 123 includes one or more "counters" for counting "events" which are indicative of system performance. Events can be, for example, cache misses, instructions executed, I/O data transfer requests, and so forth.

Known hardware and software performance monitoring systems typically include performance monitoring routines specifically designed for particular performance logic designs. For example, the performance monitoring routines PMR-A 125 only operate in conjunction with PML-A 113. Likewise, PMR-B 126, PMR-C 127, PMR-A 128, and PMR-E 129, respectively, only work with PML-B 114, PML-C 133, PML-D 134, and PML-E 123. Each of the performance monitoring routines is typically associated with data buffers designed for collecting specific performance data of the associated routines.

Generally, the performance monitoring routines 125–129 are not easily extensible when the hardware and architecture are modified. Re-engineering performance systems takes time and consumes resources. Furthermore, the specific design characteristics of known monitoring routines typically inhibits their transportability to completely different components of the system. For example, the PMR-A 125 and PMR-B 126, designed for collecting performance data from processors, can generally not be used to collect I/O performance data generated by the I/O performance logic PML-C 133. Similarly, only the PMR-E 129 can collect performance data from the software maintained logic PML-E 123.

Moreover, known monitoring systems are designed to work with a specific operating system. Therefore, multiple versions of the monitoring systems are required in situations where a single processor can execute with different operating systems. Also, known monitoring systems tend to use data structures which are difficult to access by application programs. Direct access to the performance data by application software is generally precluded.

Therefore, there is a need for a system independent interface to performance monitoring systems. The interface should be independent of the hardware and software of the system. Additionally, the performance data collected should be easily accessible to application programs.

SUMMARY OF THE INVENTION

In a computer system, events indicative of the performance of the system are generated by system hardware and software programs. A plurality of counters are available to count the events. A single counter may, at any one time, count one of a list of associated events. The design of the counters may be different. It is desired to count the events without knowing specifically which counters can count which events.

A user, using an interface, requests control of the counters. If the request for control of the counters is granted, a set of events is selected for monitoring from all of the events which can be monitored. Attributes which characterize the events and counters are maintained in an attribute table. A determination is made if the events of the set of events are valid. If the set of events are determined to be valid, each event of the set are coupled to a corresponding one of the counters. The counters are then enabled to count the events of the set according to selected attributes.

DETAILED DESCRIPTION OF A PREFERRED EMBODIMENT

Figure 2:
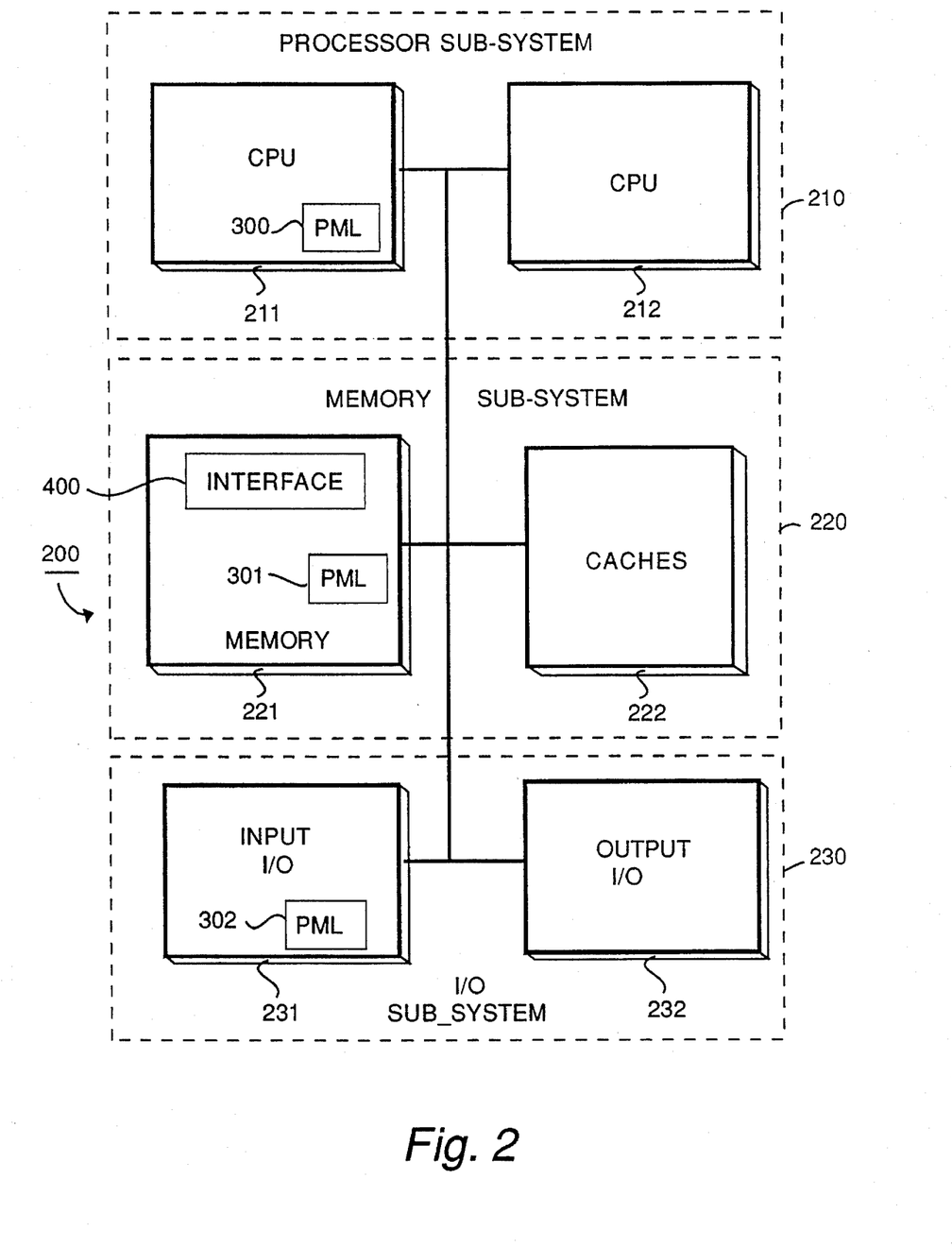
FIG. 2 is a block diagram of a performance monitoring system arranged according to principles of the invention.

FIG. 2 shows a computer system 200 that can be monitored according to the principles of the invention. The computer system 200 can be a personal computer, a workstation, a main-frame, or part of a network of computers executing process steps independently, or in parallel. The computer system 200 can include a processor sub-system 210, a memory sub-system 220, and an input/output (I/O) sub-system 230 connected to each other by a communications bus 240. The processor sub-system 210 includes CPUs 211–212. The memory sub-system 220 includes a main memory 221, and one or more caches 222. The I/O sub-system 230 can include an input I/O unit 231, and an output I/O unit 232.

The operation of the system 200 is controlled by machine instructions stored in the memory sub-system 220 as operating system and application software. During operation of the system 200, data can be read from the I/O sub-system 230 for processing by the processing sub-system 210. After processing, the data are written to the I/O sub-system 230 for persistent storage.

While the system 200 is operating, multiple execution threads, called processes, can be active in any of the processors, e.g. CPUs 211–212, at any one time. The instructions of the processes can be executed in different processor modes. For example, the CPU 211 can execute instructions of a process in a kernel, executive, supervisor, or user mode, each mode having an associated level of data security and processing restrictions, the kernel mode the least, and the user mode the most.

It is desirable to monitor the performance of the computer system 200 while the system is operating. Analysis of performance data can be used to optimize the design of the hardware and software components of the system 200. In one embodiment of the invention, some of the performance data are generated by a performance monitoring logic (PML) 300. The sub-systems 220 and 230 also incorporate performance monitoring logic 301 and 302. Typically, the logics 300–302 are of different design.

Figure 3:
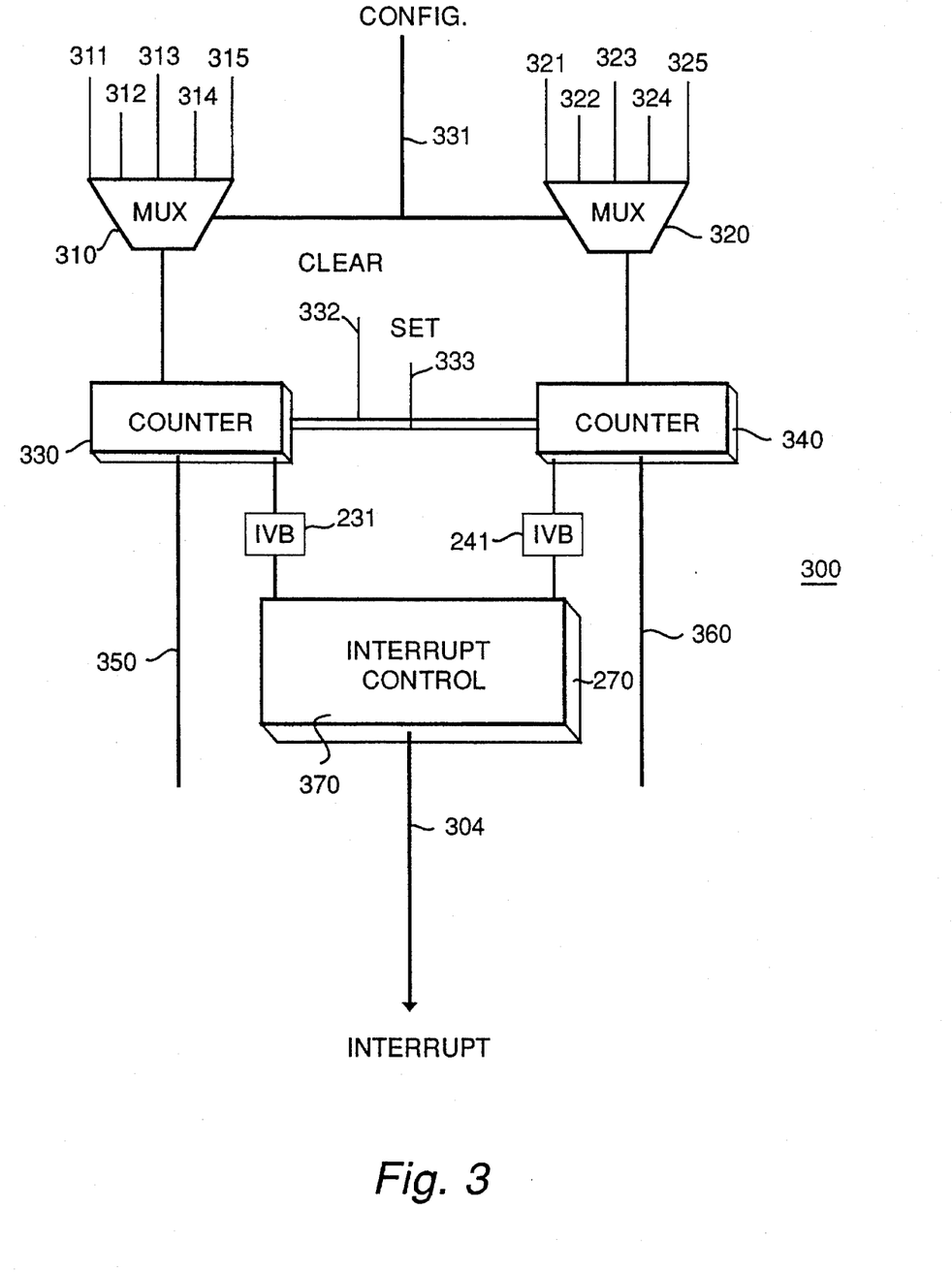
FIG. 3 is a block diagram of a performance monitoring logic including event counters.

FIG. 3 shows the PML 300. Signals or "events" representing various operating characteristics of the components being monitored are presented on lines 311-215, and lines 321-215. The exact events which are signaled are usually component specific. Typical events which can be signaled are described in greater detail below. Some of the events may be signaled on more than one line. For example, an event "instructions issued" can be signaled both on line 315 and 325. The event lines are connected to multiplexers 310 and 320 so that they may be individually selected. It should be understood that the events signalled for the PML 301 and PML 302 cart be different than the events of PML 300.

The multiplexers 310 and 320 are respectively connected to corresponding counter 330 and 340. The exact number of counters for the different performance logics 300–302 can vary. Therefore, not only are the number and types of events different for the PML 300–302, but so are the number of counters that are available to accumulate event occurrences or counts. In addition, the total number of occurrences of a specific event that can be accumulated in any one counter can vary, depending on the "size", or number of bits of the counters. The counters 330 and 340 are respectively connected to lines 350 and 360 for reading and writing data. For some types of counters, data may only be read from the counters. Other types of counters permit reading and writing counter data on lines 350 and 360. Yet, other types of counters can not be read or written. Therefore, the counters 330 and 340 may also be connected to an interrupt control circuit 370. Associated with the counter 330–340 can be InterruptValidBits 331 and 341, respectively, described in greater detail below, for indicating whether interrupts should be serviced.

During operation of the logics 300, events which can be monitored are signaled on the lines 311–315 and the lines 321–325. Specific events to be monitored are selected by a configuration (CONFIG) signal on line 331. Some of the events, for example processor cycles, are time related, and can therefore indicate elapsed time during performance data collection. At any one time, each counter can accumulate counts for one selected event. The counters 330 and 340 can be cleared and set by signals on lines 332 and 333, respectively.

Upon reaching a predetermined threshold overflow value, for example 32,768, an interrupt signal is generated on line 304 by the interrupt control circuit 370. In response to the interrupt signal on line 304, the state of the system 200 can be sampled and collected in the counters 330 and 340. Alternatively, as explained below, the state of the system can be sampled selectively as determined by other conditions, such as a process executing instructions within a predetermined address range. The sampled values can be further processed to produce, for example, execution profiles, histograms, and other statistical data to analyze the performance of the system 200.

In the prior art, as described above, the software for collecting and analyzing the performance data has generally been tailored for specific system hardware and operating system software, and known designs of performance monitoring logic. This approach has generally made it difficult to adapt performance monitoring systems to hardware and software of different designs.

In accordance with the invention, as shown in FIG. 2, a system independent interface 400 is provided so that the design of the hardware, software, and performance monitoring logics 300–302 can change without requiring modifications of the interface 400. Thus, the interface 400 can easily be transported to computer systems using other hardware and software designs, and different types of performance monitoring logics. In addition, the singular interface 400 makes it possible for a single process to monitor all the performance monitoring logics 300–302, even if the logics 300–302 are of different design.

System independence is achieved, in part, by making general assumptions about the different designs of the performance monitoring logics. These assumptions are reduced to attributes for generally characterizing the performance monitoring logics 300–302. The attributes are generally independent of each other.

Event attributes describe the events which may be monitored in the hardware and software of the system 200, for example, cache misses, branch prediction, pipeline stalls, instructions issued, arithmetic operations, processor cycles, replay traps, translation buffer misses, I/O requests, processes active, and so forth. Event attributes also indicate any dependencies which may exist among events. For example, an event which signals branch misprediction may only be monitored in conjunction with an event which signals conditional branch instructions issued.

Frequency attributes describe the frequency at which any one of the events can interrupt. For example, the frequency can simply be an integer number which is a power of two, e.g., 256, 32,768, or 65536. Thus, for example, the interrupt signal on line 304 can be generated on an overflow of a specified bit of one of the counters 330 and 340. Samples can be taken at some multiple of the number of interrupts. The frequency of interrupts for one event can be independent of the frequency at which another event interrupts.

Function attributes genetically describe the operations which can be performed on the counters during performance monitoring. The generic operations, described in detail below, can include: enabling, disabling, pausing, resuming, reading, writing, and setting counters.

Mode attributes describe which processor modes are to be monitored, and whether or not selected processes are to be monitored. Processor modes in which processes can execute, listed in an increasing order of execution restrictions, can include kernel, executive, supervisor, and user modes. Processes to be monitored can include the controlling process, other selected processes, or all processes.

Figure 4:
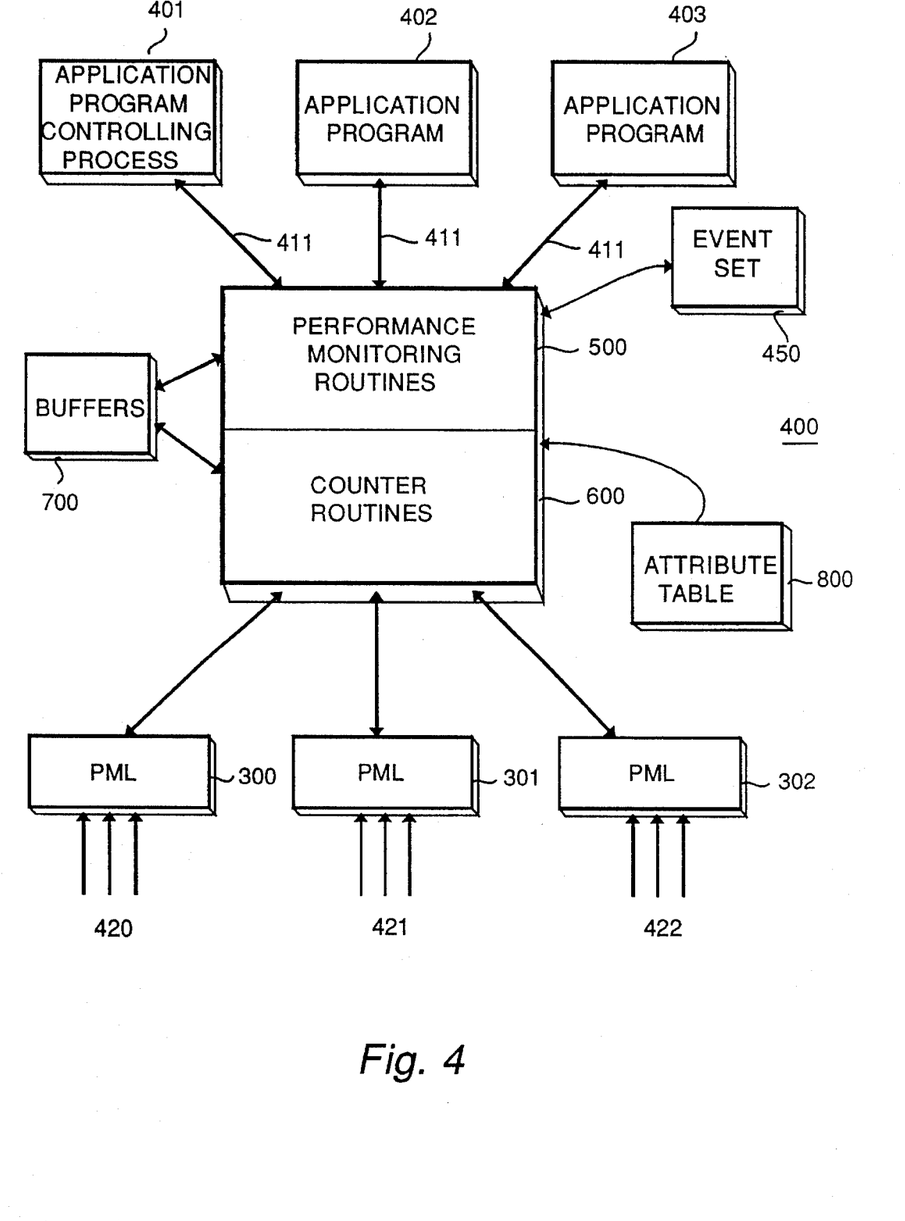
FIG. 4 is a top level flow diagram of a processor independent interface according to a preferred embodiment of the invention.

Characterizing the performance monitoring logics 300–302 of different designs in terms of general high-level attributes allows performance monitoring without knowing, a priori, which events are signaled, what interdependencies exist between events, how frequently events are signaling, how many counters are available for accumulating event counts, how the counters are coupled to the lines carrying event signals and what functions can be performed. In addition, high-level attributes permit the user to monitor different events, frequencies, functions, and modes without specifically knowing what counters are associated with which events and frequencies. The interface 400, in response to a query, can signal whether a combination of events is permissible. Thus, the interface 400 provides a flexible interface between the performance monitoring logics 300–302 and user software.

FIG. 4 shows the structure and operation of the system independent interface 400 in greater detail. Software, in the form of application programs 401–403, desires to monitor the performance of system 200 using performance monitoring logics 300–302 of different and unknown design. The logics 300–302 are, respectively, connected by lines 420–422 to the sub-systems 210, 220 and 230 for monitoring events characteristic of the performance of the system 200.

Therefore, the application programs 401–403 include calls 411 to the interface 400 to query and manipulate the performance monitoring logics 300–302. The calls 411 can include input arguments to be supplied to the interface 400 to specify exactly what attribute information is desired, and which operations should be performed. The attribute information, which describes the PML 300–302 can be stored, for example, in an attribute table 800 when the interface 400 is initialized for operation.

The interface 400, in response to query and operational calls, supplies selected attribute information from the table 800 to the application programs 401–403, and performs the requested operations. The attribute information can be returned to the calling programs in the form of output arguments. The output arguments can also include status information indicative of the requested operations, and performance data collected.

The system independent interface 400 includes performance monitoring routines (Pfm) 500 and counter routines (Ctr) 600. The Pfm routines 500 are executed in response to the calls 411, and the Pfm routines 500 call the Ctr routines 600. The Ctr routines 600, in ram, manipulate the PML 300–302 to collect performance data. Usually, the PML 300–302 are associated with firmware or software, and registers for performing primitive functions, such as enabling interrupts and reading counter data in response to a interrupt signals. It is desired that the programs 401–403 can collect performance data without having detailed knowledge of structures and operations of the PML 300–302. The events which are actually being monitored can be maintained as an event set 450, stored in the memory 221.

Also associated with the interface 400 are buffers 700 for storing performance data while the interface 400 is operating. The buffers 700 Can be allocated from the memory 221 of FIG. 2.

PERFORMANCE MONITORING ROUTINES

Figure 5:
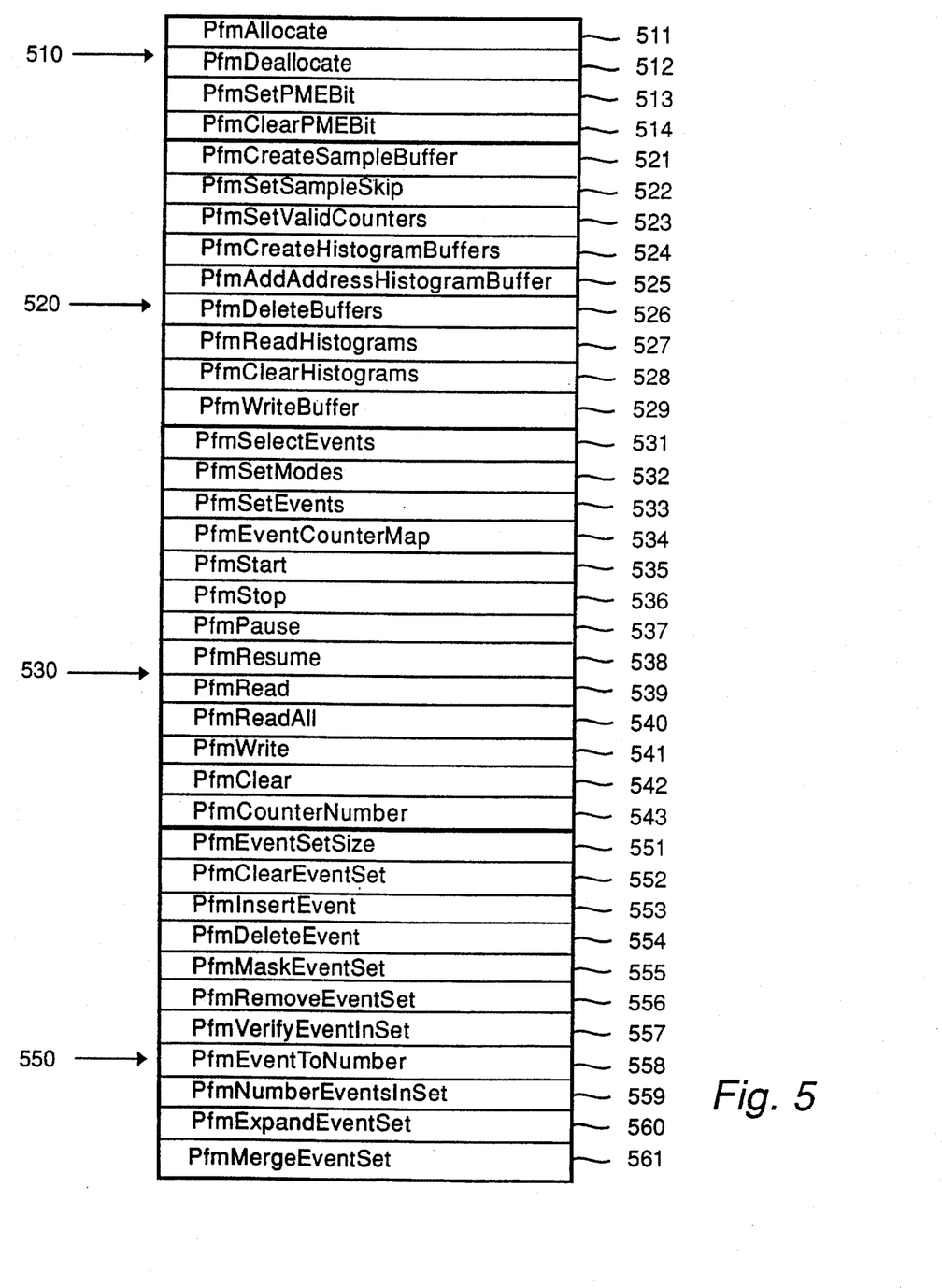
FIG. 5 is a block diagram of performance monitoring routines.

As shown in FIG. 5, the performance monitoring (Pfm) routines 500 include general control routines 510, buffer manipulation routines 520, counter control routines 530, and event set manipulation routines 550.

General Control Routines

The general control routines 510 include a PfmAllocate routine 511. This routine is used by an executing process, for example application program 401, to establish control or ownership of the PML 300–302. In other words, according to the invention, the performance monitoring logics 300–302 are treated as shareable devices, which must be "owned" or allocated to a process before they can be operated. In essence, the PfmAllocate routine 511 is a request to control the performance monitoring logics 300–302. ff one of the other processes already controls the logics 300–302, the request for control will be denied.

Once the application program 401 gains control of the PML 300–302, the program 401 is known as the "controlling" process. While the PML 300–302 are allocated to the controlling process 401, the logics can not be used by the other process 402–403. The controlling process 401 can release ownership of the PML 300–302 with a PfmDeallocate routine 512. Both of these two routines 511–512 have as an output argument status information which indicates whether the allocation or deallocation was successful.

The controlling process 401 can specify a specific process to be monitored, instead of monitoring the performance of the entire system. The specific process to be monitored can be selected with a PfmSetPMEBit routine 513. The monitored process can be the controlling process 401 or any of the other processes 402–403 identified in an input argument supplied to the PfmSetPMEBit routine 513. A performance monitoring enabled (PME) bit associated with each executable process, when set to a logical one, indicates that the process is to be monitored. A PfmClearPMEBit routine 514 disables the performance monitoring of the specified monitored process.

Buffer Manipulation Routines

While monitoring either the entire system or a specific process, the performance data are collected, for example, in the buffers 700. The buffer manipulation routines 520 are available to create, format, and delete the buffers 700. The buffers 700 are described in greater detail with reference to FIG. 7.

Figure 7:
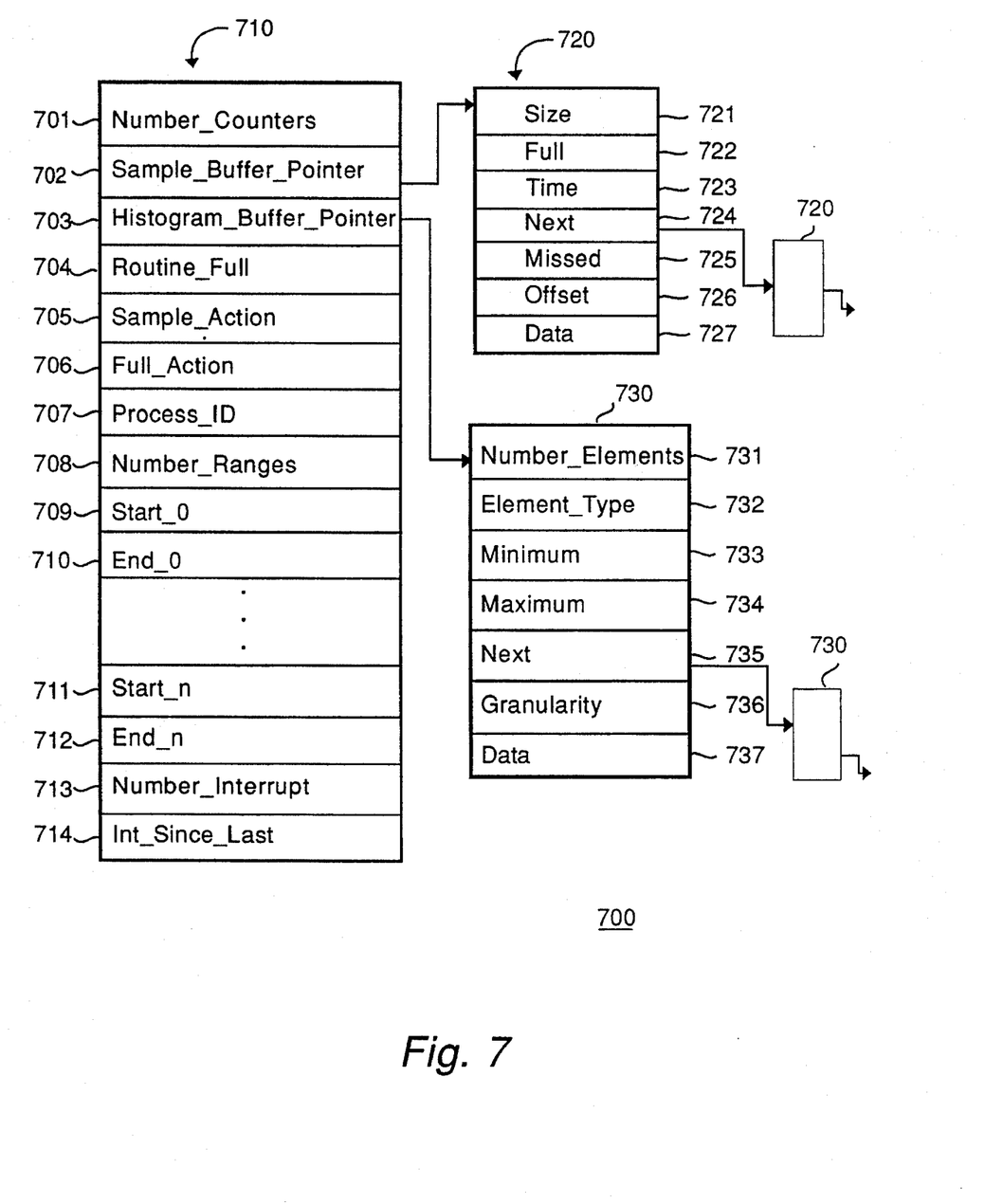
FIG. 7 is a block diagram of sample buffers.

A PfmCreateSampleBuffer routine 521 can be used to create sample buffers 700 for storing performance data during a monitoring session. This routine takes as input arguments the number of buffers to create, the size of the buffers, the performance data to be collected, and actions to be taken when certain conditions arise. For example, as an action on a buffer full condition, the caller may choose: to notify the controlling process; to call a specific routine; or to do nothing. In the later case, the controlling process may take responsibility for checking the fullness of the buffers 700. The PML 300–302 should be allocated to a process, e.g. controlled, before the buffers 700 can be created, and the PML 300–302 should not be operating, e.g., collecting samples.

A PfmSetSampleSkip routine 522 can be used to specify the number of interrupts that need to be generated before a sample is collected. This routine enables sampling at relatively slower rates. For example, if an input argument is ten, samples are taken every ten interrupts, instead of sampling for every interrupt, as is normally done.

A PfmSetValidCounters routine 523 indicates, in the InterruptValid Bit 231 or 241 of FIG. 2, for a specified counter, whether or not samples should be collected whenever an interrupt signal is generated. If the associated InterruptValidBit is set to a logical one, samples are collected in response to an interrupt. Otherwise, if the associated bit is set to a logical zero, samples are not collected. This routine is useful for processors and performance monitoring logic of the type which cannot selectively enable and disable interrupt signaling for selected counters. Thus, the collection of spurious performance data is avoided.

A PfmCreateHistogramBuffers routine 524 can be used to create specialized buffers for accumulating performance data in histogram form. For example, a range of instruction addresses can be supplied as an input argument. Then, every time an event is signalled, the event can be associated with a memory address or a range of memory addresses. Granularity of the address values can be provided by an input argument which causes the bits of the instruction address to be shifted to discard insignificant bits. This is useful to compress performance data of a large address space into smaller histogram segments. A related routine PfmAddAddressHistogramBuffer 525 can be used to create additional histogram buffers, perhaps for different or overlapping instruction address ranges. A PfmDeleteBuffers routine 526 deletes buffers specified in the input argument.

The performance data can be read from the histogram buffers with a PfmReadHistogram routine 527. The routine 527 takes as an input parameter an address of a user specified array which can be used to store the performance data read from the histogram buffer. A PfmClearHistogram routine 528 can be used, for example, after the performance data are read, to clear or "initialize" the specified histogram buffers. A PfmWriteSampleBuffers routine 529 can be used to write the data of the sample buffers 700 to a file specified in an input argument of the routine.

Counter Control Routines

The counter control routines 630 include a PfmSelectEvents routine 531 to select specific events, e.g., the "event set" 450 of FIG. 4, to be monitored, and the frequency at which the events of the event set 450 are to be monitored.

The routine 531 can be called repeatedly to select different events having different sampling frequencies. The events and frequencies are supplied as input arguments to the routine 531. If the requested event can not be monitored, or if there are conflicts or dependencies among the selected events, the calling process will be notified in an output argument.

To actually match up the counters with the set of events 450, the PfmSetEvents routine 532 is used. That is, the PfmSetEvents routine 532 can request the coupling of the event lines 311–315, and 321–325 with the counters 330–340 via, for example, the multiplexers 320 and 330. It should be noted in the interface 400 of the present invention, in contrast with the prior art, that the controlling process 401 which is performing the monitoring is not required to know which counter is assigned to which event. The controlling process 401 merely selects the set of events 450 to be monitored. The coupling between the events, their attributes and the corresponding counters is handled by the interface 400.

A PfmSetModes routine 533 can be used to select the process mode to be monitored. For example, monitoring can be selectively enabled only for specific processing modes, e.g., kernel, executive, supervisory, user. This routine can also be used to specify which processes are to be monitored.

A routine PfmEventCounterMap 534 can be used to determine, after the fact, which counters are monitoring which events. This information is supplied, for example, in an output argument as an array, where the index to an array element is an identifying number associated with a counter, and the contents of the indexed array element describes the associated event. For example, an array "(313, 323)" would indicate that a first counter, for example counter 330 of FIG. 3, is coupled to line 313, and a second counter is coupled to event line 323.

To start a performance monitoring session for one or more selected events, a PfmStart routine 535 is used. The selected events were identified, for example, with the PfmSelectEvents routine 531. Before monitoring can commence, the counters must be allocated. Monitoring can be stopped with a PfmStop routine 536. Counters can, respectively, be paused, and resumed by a PfmPause 537 and PfmResume 538 routine. While a specified counter is paused, the value maintained in the counter is not altered.

The data or "counts" stored in counters can be read by using a PfmRead routine 539. To read all of the counters a PfmReadAll routine 540 can be used. Data may be written to the counter by using a PfmWrite 541 routine. The data and counters to be read and written are specified as input arguments to the routines 539–541.

To clear or zero a specified counter, the PfmClear routine 542 can be used. In order to identify a counter associated with a particular event, a PfmCounterNumber routine 543 can be used. The routine 543 takes as an input argument an event number and returns the associated counter number as an output argument.

Event Set Manipulation Routines

The event set manipulation routines 551–561 are used to clear, insert, delete, mask, remove, verify, expand, and merge events and sets of events. These routines 551–561, one-by-one can provide a user level interface to corresponding Ctr routines 651–661, described below, with reference to FIG. 6.

COUNTER ROUTINES

Figure 6:
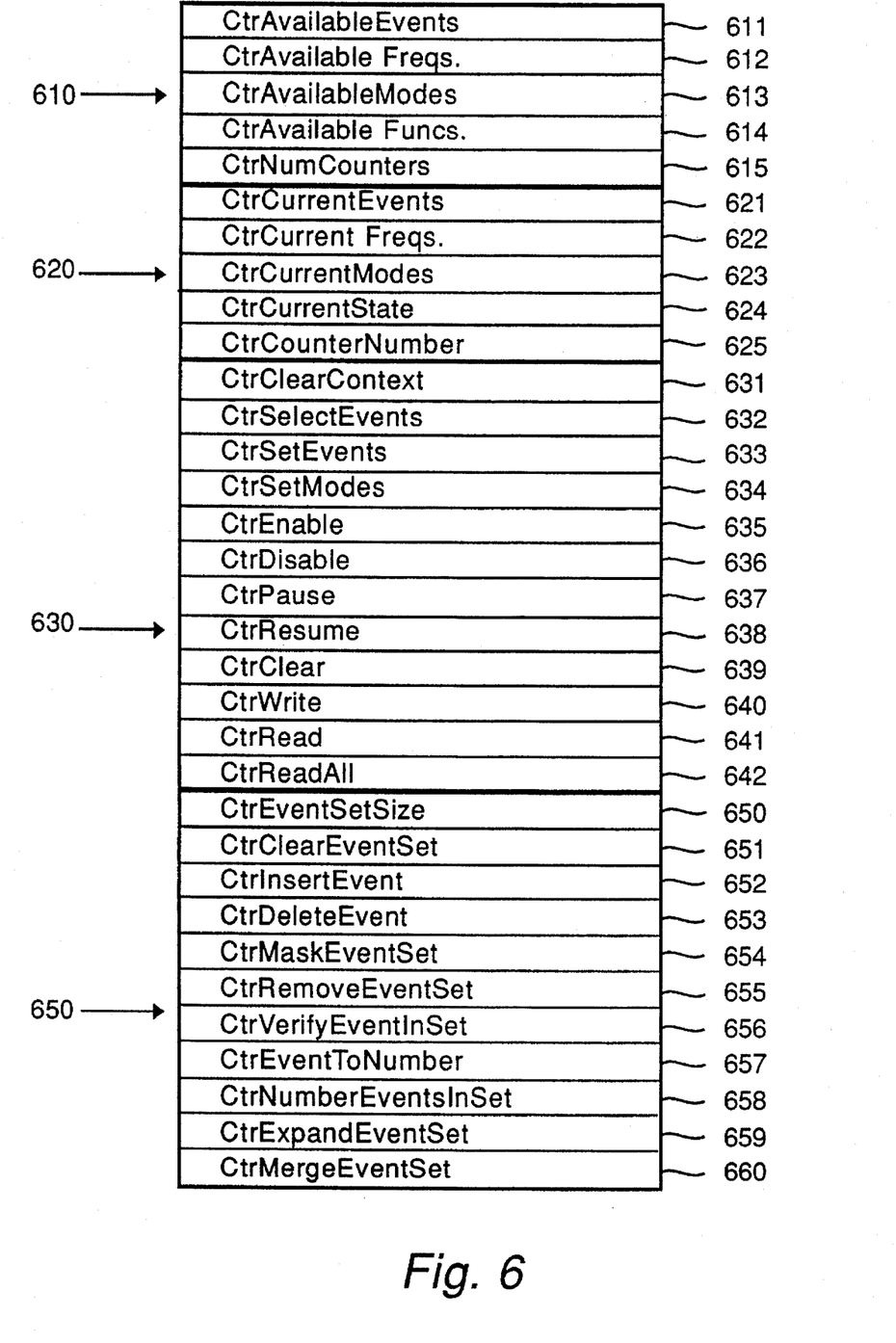
FIG. 6 is a block diagram of counter routines.

Now with reference to FIG. 6, the counter routines (Ctr) 600 are described in greater detail. The Ctr routines 600 provide the interface between the Pfm routines 500 and the PML 300–302. The Ctr routines 600 include query counter routines 610, query current counter state routines 620, control routines 630, and counter event set manipulation routines 650.

Query Counter Routines

A CtrAvailableEvents routine 611 can be used to accumulate events to be monitored into the event set 450. The available events are returned as an output argument, and another output argument indicates whether or not the combination of events in the event set 450 are valid.

A CtrAvailableFreq routine 612 can be used to determine what interrupt frequencies are associated with a selected event. The routine takes as an input an event number. The frequency attributes for the event are returned as an output argument. This means that the user of the performance counters, without knowing counting frequencies, can select an event to monitor, and once the events have been selected and coupled to a counter, the user can query the interface 400 for frequency attributes associated with the selected counter to determine sampling rates.

A CtrAvailableModes routine 613 can be used to determine the available processor modes. The mode attributes are passed back as an output argument. A CtrAvailableFuncs routine 614 returns as an output argument the function attributes. When called, a CtrNumCounter routine 615 returns the number of counters that are available.

Query Current Counter State

In order to query the current operating states of the counters, the following routines can be used. A CtrCurrentEvents routine 621 can be used to determine what events are currently being monitored. The routine 621 takes as an input argument a counter number, and returns as an output argument the event set associated with the specified counter.

A CtrCurrentFreq routine 622, when supplied with an event number, will return the frequency at which the specified event is being monitored. The value resumed by the routine will be the actual number of events counted for each interrupt, unless the counter is of the non-interrupting type, or if interrupts for the counter are disabled, in which case the returned value will be zero.

A CtrCurrentModes routine 623 can be used to determine which processor modes are currently being monitored by the counter specified in the input argument.

In order to determine a current operating state of a specific event and counter, a CtrCurrentState routine 624 can be used. The routine takes as an input argument the counter and event number, and returns as an output argument values which indicate if samples are being collected for the specified event, and if the counter is generating interrupts. A CtrCounterNumber routine 625 returns a counter number for the event specified in the input argument.

Counter Control Routines

The counter control routines 630 are used to operate the counters.

A CtrClearContext routine 631 is used to clear or initialize the counter specified in the input argument. A CtrSelectEvents routine 632 can be used to select events to be monitored, and the frequency at which each of the selected events should be monitored. The routine takes as an input argument an event set and frequencies to be associated with the events of the set.

The events and frequencies selected by the CtrSelectEvents routine 632 are actually written to the counters by a CtrSetEvents routine 633. The processor modes during which event samples are to be collected are set with a CtrSetModes routine 634.

A CtrEnable routine 635 is used to start the actual counting of events selected with the CtrSelectRoutine 632, and set with the CtrSetEvents routine 633. Counting is stopped by a CtrDisable routine 636.

To temporarily pause a specified counter without resetting the count value, the CtrPause routine 637 can be used. Counting is resumed with the CtrResume routine 637. The counts of a specified counter can be set to zero with the CtrClear routine 639. Counter values can be written and read by a CtrWrite and CtrRead routine, respectively 640 and 641. A CtrReadAll routine 632 is also provided to read all of the counters.

Counter Event Set Manipulation

The counter event set manipulation routines 650 can be used for directly manipulating event sets. These routines remove the need by the user of the routines to know how events sets are implemented.

A CtrEventSetSize routine 651 returns as an output argument the size of an event set 450, expressed as the number of bytes. The size of the event set 450 can be passed as a parameter to a memory allocation routine to set aside storage space for the event set 450.

A CtrClearEventSet routine 652 removes all events in an event set. A CtrInsertEvent routine 653 can be used to add an event to an existing event set. Similarly, a CtrDeleteEvent routine 654 will remove a specified event from an event set. A CtrMaskEvent routine 655 takes as input arguments pointers to a valid event set and a destination event set. All events which are not members of the valid event set are removed from the destination event set.

A CtrRemoveEventSet routine 656 takes as input arguments a first event set and a second event set. The routine 656 removes all events that are members of the first event set from the second event set. A CtrVerifyEventInSet routine 657 takes as input arguments an event set and an event number. The routine 657 returns as an output argument a TRUE logical condition if the specified event is a member of the event set; otherwise, a logical FALSE is returned. A CtrEventToNumber routine 658, for a specified event set, returns the event having the lowest event number. If the value returned is zero, the event set is empty.

A CtrNumberEventsInSet routine 659, when supplied with an event set as an input argument, returns the number events that are included in the event set. A CtrExpandEventSet routine 660 takes as input arguments an event set and an array. The routine 660 places the event number of the events which are members of the event set in the set in the specified array. A CtrMergeEventSet routine 661 takes as input arguments a source event set, and a destination event set. All of the events of the source set are added to the destination set by the routine 661.

Data Structures

FIG. 7 shows the structure of the sample buffers 700. The sample buffers 700 include a buffer descriptor 710, one or more sample buffers 720, and one or more histogram buffers 730. The buffer descriptor 710 includes the following fields. A Number_Counter field 701 storing the number of counters that are available for performance monitoring. A Sample_Buffer_Pointer field 702 stores a pointer to a current sample buffer 720 to be used for storing sample data. If the pointer is not stored in this field, sampling is not done. A Histogram_buffer_pointer field 703, if histogram data collection is being done, stores a pointer to a current histogram buffer 730.

A Routine_Full field 704 stores a pointer to a routine that can be executed when the buffer reaches a full state. A Sample_Action field 705 indicates what action should be taken when a particular sampling condition is reached. Actions taken can include, do nothing, execute the routine pointed to in the Routine_Full field 704, or notify the controlling process. A Sample_Action field 705, indicates what specific action, e.g., do nothing, process, etc., to take for individual samples. a Full_Action indicates what action to take on a buffer full condition. A Process_ID field 707 identifies a process to be notified for any action indicated in the Sample_Action and Full_Action fields, respectively, 705 and 706.

A Number_Ranges field 708 indicates the instruction address ranges, e.g. program counter values, that are active while collecting performance data. The starting and ending addresses of the ranges are stored in the field pair Start_0 and End_0 709–710 to Start_n and End_n 711–712, and so forth.

A Number_Interrupt field 713 stores the number of interrupts that should occur before a sample of the counter values should be collected. A Int_Since_Last field 714 stores the number of interrupts that have occurred since the last sample was collected.

Each sample buffer 720 can include the following fields. A Size field 721 stores the size of the buffer, e.g., the number of bytes consumed. A Full field 722 stores a flag which indicates if the buffer 720 is full. A Time field 723 stores the time when sampling of performance data stored in this buffer was initiated. A Next field 724 stores a pointer to a next sample buffer 720. The sample buffers 720 can be arranged in a ring, with the Next field 724 of the last sample buffer 720 pointing to the first sample buffer. A Missed field 725 stores the number of samples which were missed while other buffers are serviced. An Offset field 726 stores an offset to a location in a Data field 727 where the next sample can be stored. The actual sampled data are stored in the Data field 727.

Each histogram buffer 730 can include the following fields. A Number_Elements field 731 indicates the number of instruction address ranges associated with this buffer. A Type field 732 stores an indication of what type of histogram is being collected. Types can include total samples collected, samples per address within the address range, samples per processor mode, and so forth. A Minimum field 733 stores the minimum data value stored in the buffer. A Maximum field 734 stores the maximum data value represented in the histogram buffer. A Next field 735 of each histogram buffer 730 points to the next histogram buffer arranged, for example, in a ring. A Granularity field 736 indicates the granularity of the instruction address ranges, see the PfmCreateHistogramBuffers routine 524.

For histograms, the Data field 737 includes counting cells arranged in a two dimensional array, a first dimension for each counter, and the second dimension corresponding to the value stored in the Number_Element field 731. The cells are incremented when an interrupt occurs and pertinent performance data falls within the ranges specified.

Figure 8:
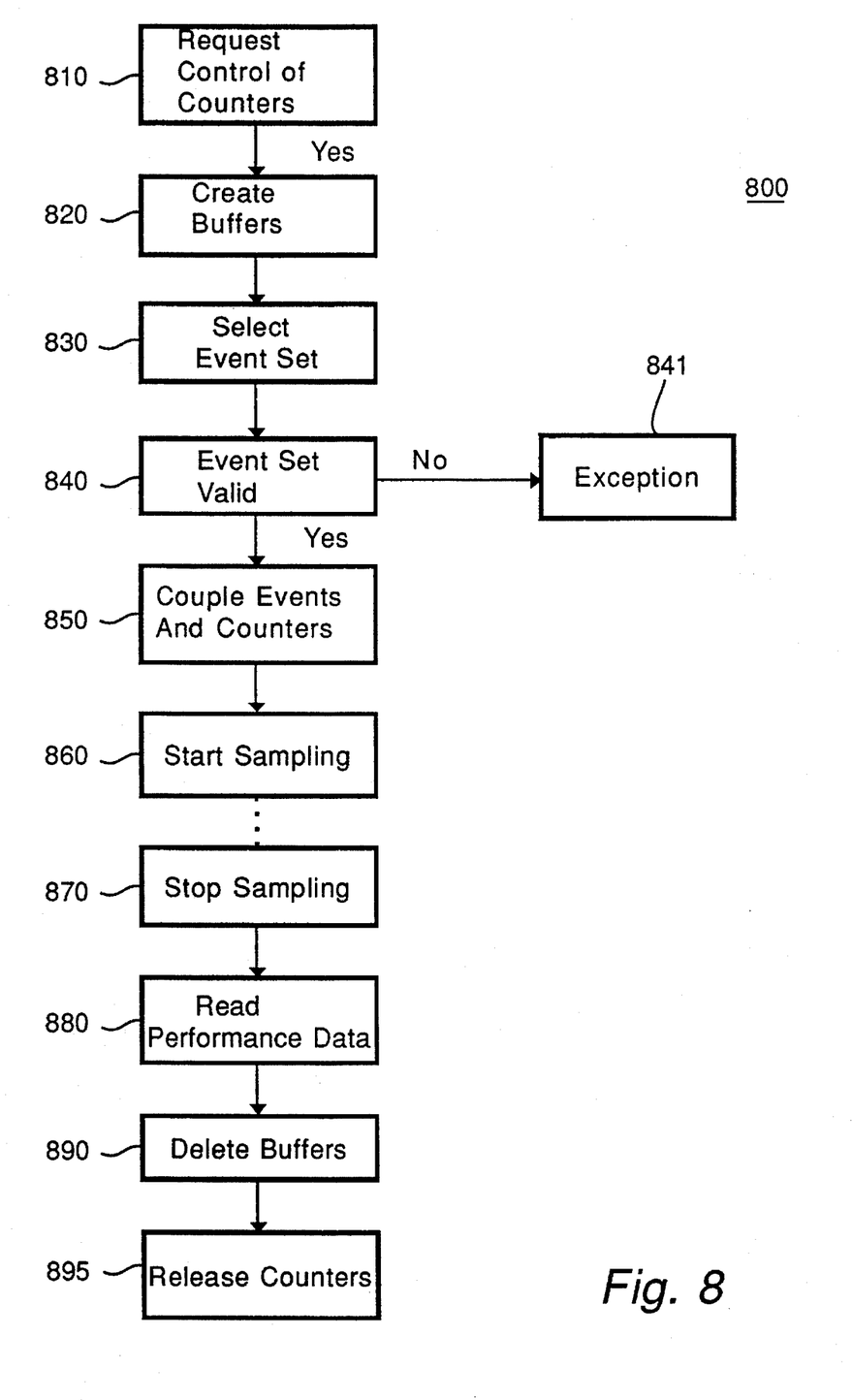
FIG. 8 is flow diagram of a performance monitoring process according to the principles of the invention.

FIG. 8 shows an example user procedure 800 which can use the interface 400 for collecting performance data of the system 100. In step 810, control of the performance counters is requested using, for example, the PfmAllocate routine 511. Buffers for storing performance data are created using the PfmCreateSampleBuffer routine 521 in step 820. The events to be monitored are selected in step 830 by calling the PfmSelectEvents routine 531. The event set can be validated in step 830 with exceptions handled in step 841. The events and counters are coupled and initialized in step 850. Collection of performance data is started in step 860.

After sufficient data are collected, in step 870, sampling is stopped by calling the PfmStop routine 536. After the performance data are read in step 880, the buffers are deleted in step 890, and ownership of the performance is released in step 895 by calling the PfmDeallocate routine. If the PfmCreateHistogramBuffers routine 524 is called in step 820, the performance data can be collected in histogram format. If the PfmSetPMEBit and PfmSetModes routines are called after step 840, performance data for a specific process and processor mode can be collected.

It will be apparent to those skilled in the art that various modifications can be made to the present invention without departing from the spirit and scope of the invention as set out in the appended claims.

I claim:

1. A method for monitoring a performance of a computer system, comprising:

generating a plurality of events indicative of the performance of the computer system, each event capable of being counted by at least one of a plurality of counters, said plurality of counters including counters of different designs;

requesting control of said plurality of counters;

in response to control being granted, selecting a set of events from said plurality of events;

determining if said set of events is valid to be counted by said plurality of counters;

in response to said set of events being valid, coupling each event of said set of events to a corresponding counter of said plurality of counters;

enabling said corresponding counters of said plurality of counters to count said set of events to monitor the performance of the computer system.

2. The method of claim 1 wherein each counter of said plurality of counters and each event of said plurality of events is associated with a plurality of attributes for characterizing each counter and each event, and further comprising:

for each event of said set of events and corresponding counter of said plurality of counters selecting a set of attributes from said plurality of attributes;

determining if said sets of attributes is valid for said set of events and corresponding counters;

enabling said corresponding counters of said plurality of counters according to said set of attributes.

3. The method of claim 2 wherein said plurality of attributes include frequency attributes and interrupt attributes, and further comprising:

selecting a specific frequency attribute and a specific interrupt attribute.

4. The method of claim 1 further comprising:

in response to control being granted, allocating a memory buffer, and stirring, for each event of said set of events, a count in said memory buffer.

5. The method of claim 4 wherein said memory buffer includes a sample buffer and a histogram buffer.

6. The method of claim 2 wherein the computer system includes a plurality of processes, and further comprising:

selecting a specific process of said plurality of processes to monitor.

7. The method of claim 6 wherein each process of said plurality of processes can execute in a plurality of modes, and further comprising:

selecting a specific mode of said plurality of modes to monitor.

8. A method for monitoring a performance of a computer system, comprising:

querying an interface of the computer system to supply a set of events which represent a performance of the computer system;

said interface accessing an attribute table which characterize said set of events;

each event of said set of events associated with at least one counter of a plurality of counters of the computer system, said plurality of counters for counting said set of events;

coupling each event of said set of events to a corresponding counter of said plurality of counters;

enabling said corresponding counters to count said set of events to monitor the performance of the computer system.

9. A system for monitoring a performance of a computer system, comprising:

a plurality of event signals indicative of a performance of the computer system;

means for counting said plurality of event signals;

means for characterizing attributes of said plurality of event signals and said means for counting;

means for selecting a set of event signals from said plurality of events;

means for coupling each event signal of said set of event signals to said means for counting;

enabling said means for counting according to said attributes to count said set of event signals to determine the performance of the computer system.

* * * * *